United States Patent
Dib

(10) Patent No.: US 9,441,943 B2
(45) Date of Patent: Sep. 13, 2016

(54) METHOD OF DETERMINING THE POSITION AND THE SPEED OF A ROTOR IN A SYNCHRONOUS ELECTRIC MACHINE USING STATE OBSERVERS

(71) Applicant: IFP Energies nouvelles, Rueil-Malmaison (FR)

(72) Inventor: Wissam Dib, Suresnes (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 106 days.

(21) Appl. No.: 14/283,330

(22) Filed: May 21, 2014

(65) Prior Publication Data
US 2014/0346990 A1 Nov. 27, 2014

(30) Foreign Application Priority Data

May 21, 2013 (FR) ...................... 13 54520

(51) Int. Cl.
*G01P 3/48* (2006.01)
*G01B 7/30* (2006.01)
*H02P 23/12* (2006.01)

(52) U.S. Cl.
CPC .................. *G01B 7/30* (2013.01); *H02P 23/12* (2013.01)

(58) Field of Classification Search
CPC ........... H02P 21/0039; H02P 21/0053; H02P 2203/11; H02P 2207/05; H02P 6/16; H02P 6/18; H02P 6/165; H02P 21/146; H02P 23/12; G01B 7/30
USPC ......... 318/400.32, 400.34, 400.41, 667, 721, 318/809, 400.33; 324/160–180; 361/236–244; 388/928.1
See application file for complete search history.

(56) References Cited

U.S. PATENT DOCUMENTS

| | | | | |
|---|---|---|---|---|
| 4,772,839 A * | 9/1988 | MacMinn | ............... | H02P 6/185 318/685 |
| 5,296,793 A * | 3/1994 | Lang | ..................... | H02P 21/141 318/721 |
| 5,708,346 A * | 1/1998 | Schob | ................. | F16C 32/0493 318/803 |
| 6,137,258 A * | 10/2000 | Jansen | .................. | H02P 21/141 318/802 |
| 6,337,554 B1 | 1/2002 | Voillat | | |
| 7,045,988 B2 * | 5/2006 | Ha | .......................... | H02P 21/04 318/807 |
| 7,560,894 B2 * | 7/2009 | Salomaki | ................ | H02P 21/32 318/701 |
| 9,106,177 B2 * | 8/2015 | Son | ......................... | H02P 21/13 |
| 2010/0237817 A1 * | 9/2010 | Liu | ..................... | H02P 21/0007 318/400.34 |
| 2015/0137720 A1 * | 5/2015 | Kobayashi | .......... | H02P 29/0055 318/400.15 |

FOREIGN PATENT DOCUMENTS

| | | |
|---|---|---|
| EP | 1 492 224 A1 | 12/2004 |
| EP | 1 959 553 A1 | 8/2008 |
| FR | 2 623 033 | 5/1989 |
| FR | 2 781 318 | 1/2000 |
| FR | 11/03994 | 12/2011 |
| GB | 1 214 331 | 12/1970 |
| WO | WO 2013/093223 A2 | 6/2013 |

* cited by examiner

*Primary Examiner* — Rita Leykin
(74) *Attorney, Agent, or Firm* — Fitch, Even, Tabin & Flannery LLP

(57) ABSTRACT

The invention is a method of determining the position and the speed of the rotor in a synchronous electric machine using a state observer of the currents of the electric machine and the injection of signals. Thus, the invention provides position information which is accurate, notably at low speed, without using a position detector. The invention also is a control method and system for controlling a synchronous electric machine which accounts for the position determined for the rotor.

27 Claims, 1 Drawing Sheet

US 9,441,943 B2

METHOD OF DETERMINING THE POSITION AND THE SPEED OF A ROTOR IN A SYNCHRONOUS ELECTRIC MACHINE USING STATE OBSERVERS

CROSS REFERENCE TO RELATED APPLICATION

Reference is made to French Patent Application Serial No. 13/54.520, filed May 21, 2013, which application is incorporated herein by reference in its entirety.

BACKGROUND OF THE INVENTION

1. Field of the Invention

The present invention relates to the control of synchronous electric machines, notably for motor vehicles.

2. Description of the Prior Art

A synchronous machine is comprised of a rotating part which is the rotor and of a stationary part which is the stator. The rotor can be made up of permanent magnets or of a DC-powered coil and a magnetic circuit which is referred to as the electromagnet. The stator comprises three phases with each phase having at least one coil (also referred to as winding) connected thereto with the coils being supplied with electrical power and voltage. An external force is used to rotate the rotor which is a magnetic field induced by an alternating electric current in the coils (windings) of the stator which causes the rotor to rotate. The speed of this rotating field is referred to as the "synchronous speed".

To control synchronous electric machines, it is important to know in real time the angular position and the speed of the rotor. Indeed, the position information is used conventionally to provide vector control of the torque of the machine. Vector control is referred to as controlling the machine to produce the torque required by the application which requires the electric currents circulating therein to be maintained in phase and in synchronism with the position of the rotor. The control of the electric machine therefore applies voltages at the terminals of the motor, which are provided by a torque control algorithm.

Position detectors, of either the Hall effect or inductive type for example, are commonly used to determine the position of the rotor. However, low-cost position detectors are not accurate enough, notably for high rotating speeds, and they therefore do not allow precise control of the torque of the electric machine. Furthermore, these detectors can be subject to failure or involve measurement noise, thus generating measurement uncertainties. The use of a position detector is for example described in British patent application 1,214,331 A. Another option uses precise position detectors such as high-resolution incremental encoders or absolute detectors called resolvers which are detectors based on the detection of a rotating magnetic element, or on an optical interferometry principle. However, these position detectors have the major drawback of being expensive.

Another solution of the prior art is the reconstruction of the position of the rotor by estimating, from the electric measurements, a physical quantity that varies with the position of the rotor. The position estimations can be classified into two major categories which are:

Those based on the injection of particular signals in the electric machine control, which require applying particular voltages at the terminals of the electric machine so that the position can be determined from electric measurements on the motor. For example, French patent application 2,623,033 A1 describes the injection of short pulses in two non-energized phases. The injection of particular signals involves constraints regarding the electric machine control, which do not enable optimum control of the motor during operation thereof.

Those requiring no particular signal at the motor input, which are based only on a mathematical description of the behavior thereof by a real-time estimator, are also referred to as an observer. But this technique has the drawback of not delivering a precise estimation in a case of near-zero or low motor speed. For example, French patent application 2,781,318 B1 discloses a method of estimating the rotation angle of the rotor through calculation from signals provided by voltage sensors. U.S. published patent application 2010/237,817 A describes the use of an observer utilizing an equivalent electromotive force model.

In order to overcome the drawbacks of the prior solutions, there are known "hybrid" solutions using a position detector for low rotating speeds, as well as an estimation method for high speeds. For example, the assignee's French patent application 11/03,994 describes such a hybrid solution with an algorithm allowing determination of the position and the speed of the motor for high rotating speeds. However, these hybrid solutions always require using a detector for low electric machine speeds. Furthermore, the prior art solutions do not have sufficient precision for control of electric machines. Indeed some prior art solutions make approximations prior to developing observers which are referred to as Kalman filter observers. Moreover, some of these Kalman filter observers require many complex calculations.

SUMMARY OF THE INVENTION

The present invention is a method of determining the position and the speed of the rotor of the synchronous electric machine, using a state observer for the currents of the electric machine and the injection of signals. The invention provides accurate position information, notably at low speed, without using a position detector. Indeed, signal injection makes the model describing the electric machine's dynamics observable, including at standstill and is robust in rejecting measurement noise.

The invention relates to a method of determining the position $\theta$ of a rotor of a salient-pole synchronous electric machine, wherein currents $i_m$ and voltages $u_m$ of the phases of the electric machine are measured. The following stages are carried out for this method:

a) imposing a voltage $u_{imp}$ on the phases of the electric machine;

b) constructing a state model of the total magnetic flux $\chi_{\alpha\beta}$ circulating in the electric machine, with the magnetic flux $\chi_{\alpha\beta}$ being a function of the position of the rotor;

c) constructing a state observer of currents $\hat{x}$ and of speed $\hat{\omega}$ of the rotor by using the state model of the total magnetic flux $\chi_{\alpha\beta}$ and the measured currents $i_m$ and voltages $u_m$; and d) determining the position $\hat{\theta}$ of the rotor by using the state observer of speed $\hat{\omega}$ and the imposed voltage $u_{imp}$.

According to the invention, the method is applied for a rotating speed of the rotor that is below or substantially equal to 100 rpm.

Advantageously, the imposed voltage $u_{imp}$ has an amplitude $U_c$ greater than the control voltage of the electric machine and a high frequency $f_c$ greater than the control frequency of the electric machine.

Advantageously, the amplitude $U_c$ is substantially equal to 10 V and the frequency $f_c$ is substantially equal to 1 kHz.

Preferably, imposed the voltage $u_{imp}$ in the complex plane is written with a formula of the type: $u_{imp}=U_c e^{j\theta_c}$, with j being the complex number and $\theta_c$, being the position such that $\dot{\theta}_c=2\pi f_c$.

According to an embodiment of the invention, the state model of the total magnetic flux $\chi_{\alpha\beta}$ circulating in the electric machine is constructed by carrying out the following stages:
i) determining voltages $u_{\alpha\beta}$ and currents $i_{\alpha\beta}$ in a Concordia reference frame by transformation of the measured currents $i_m$ and voltages $u_m$;
ii) determining the dynamics of magnetic flux $\chi_{\alpha\beta}$ by an equation of the type: $\dot{\chi}_{\alpha\beta}=-Ri_{\alpha\beta}+u_{\alpha\beta}$, with R being the resistance of the windings of the electric machine.

Advantageously, the state observers of the currents and of the rotor speed are constructed by carrying out the following stages:
i) determining a state representation of current $i_{\alpha\beta}$ from the state model of the magnetic flux $\chi_{\alpha\beta}$ by a formula:

$$i_{\alpha b} = -\sigma B \begin{pmatrix} \cos(\psi) & -\sin(\psi) \\ \sin(\psi) & \cos(\psi) \end{pmatrix} i_{\alpha\beta} +$$

$$\sigma AQ(2\theta+\varphi)i_{\alpha\beta} + \frac{\Phi\omega}{\lambda-\eta}\begin{bmatrix}\sin\theta \\ -\cos\theta\end{bmatrix} + \frac{\lambda}{\lambda^2-\eta^2}Iu_{\alpha\beta} - \eta Q(2\theta)u_{\alpha\beta}$$

with $\phi$ being the flux created by the permanent magnets of the electric machine, $$\lambda = \frac{(L_d + L_q)}{2}$$

and $$\eta = \frac{(L_d - L_q)}{2},$$

with $(L_d, L_q)$ being the direct and quadrature inductances of the electric machine, $$Q(\cdot) = \begin{bmatrix} \cos(\cdot) & \sin(\cdot) \\ \sin(\cdot) & -\cos(\cdot) \end{bmatrix},$$

and $$I = \begin{bmatrix} 1 & 0 \\ 0 & 1 \end{bmatrix}$$

$$\sigma = \frac{1}{\lambda^2 - \eta^2}, A = 4\lambda^2\eta^2\omega^2 + R^2\eta^2, B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

ii) transforming the state representation in the complex plane by putting $x=i_\alpha+ji_\beta$ and $u=u_\alpha+ju_\beta$, with j being the complex number; and
iii) determining the state observers of the current and of the rotor speed by equations of the type:

$$\dot{\hat{x}} = j\hat{\omega}\hat{x} + (-k_1 + jk_2)(\hat{x} - y_n)$$

$$\dot{\hat{\omega}} = g \cdot \text{Im}(\hat{x}(\hat{\bar{x}} - \bar{y}_n)),$$

with being $$y_n = \frac{x}{\|x\|}$$

the normalized current measurements and $k_1$ and $k_2$ and g gains allowing the convergence of the observer to be managed.

Furthermore, the position $\hat{\theta}$ of the rotor can be determined by the following stages:
i) determining a coefficient $\hat{c}_2$ from the state observer of the speed $\hat{\omega}$ and from the imposed voltage $u_{imp}$ using an equation of the type:

$$\hat{c}_2 = \frac{jU_c L_1(2\hat{\omega} - \omega_c)}{\omega_c(\lambda^2 - \eta^2)(\omega_c - 2\hat{\omega}) - R^2 + j2R\lambda\left(\omega_c - \frac{\hat{\omega}}{2}\right)}$$

with $\omega_c=2\pi f_c$, and
ii) determining the position $\hat{\theta}$ of the rotor by use of the coefficient $\hat{c}_2$ and of measured currents x from an equation: $\hat{\theta}=\frac{1}{2}(\text{angle}(x)-\text{angle}(\hat{c}_2)-\Phi)$ with $\Phi$ being the phase shift induced by a low-pass filter of cutoff frequency $f_c$ of the estimated current $\hat{x}$.

Furthermore, the invention relates to a method of controlling a synchronous electric machine, wherein the following stages are carried out:
determining position $\hat{\theta}$ and speed $\hat{\omega}$ of the rotor of the electric machine according to the method described above; and
controlling the torque of the synchronous machine according to the determined position and speed.

The invention also relates to a system for controlling a synchronous electric machine using the control method as described above.

The invention also relates to a vehicle, notably a hybrid or electric motor vehicle, comprising at least one synchronous electric machine, comprising a control system as described above.

BRIEF DESCRIPTION OF THE DRAWINGS

Other features and advantages of the method according to the invention will be clear from reading the description hereafter of embodiments given by way of non limitative example, with reference to the accompanying figures wherein.

DETAILED DESCRIPTION OF THE INVENTION

It is to be noted that the method and the system according to the invention are suited for salient-pole synchronous electric machines. The synchronous electric machine can be either one of using a permanent magnet for providing, controlled excitation or using double excitation. Such a machine is comprised of a rotating part which is the rotor and of a stationary part which is the stator. The rotating part comprises at least one magnet (or electromagnet). The stator comprises at least three coils distributed among three phases, which are supplied electrical current alternately to generate a magnetic field which rotates the rotor. The coils are supported by a frame referred to as the casing.

Figure 1:
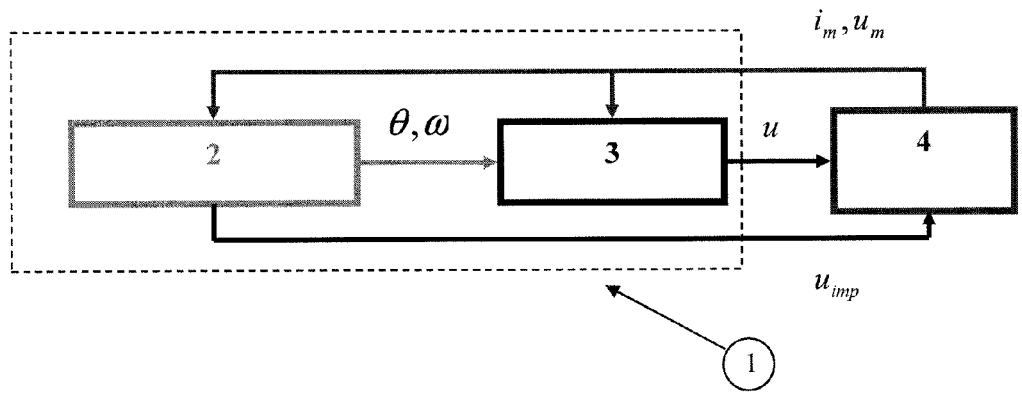
FIG. 1 illustrates the control of a synchronous electric machine according to the invention.

FIG. 1 illustrates the control of a synchronous electric machine conventionally made up of three phases. Electric machine (4) is provided with means for measuring the phase voltages and currents; which are well known and not shown. Control means (1) of the electric machine include means (2) for determining the position and the speed of the rotor of the electric machine (4) and means (3) for controlling the torque of electric machine (4). Means for determining the rotor position and means for determining speed (2) determine the position and the speed of the rotor from the measurements of currents $i_m$ and voltages $u_m$. These are the currents and the voltages of each one of the three phases of electric machine (4). Means for controlling torque (3) apply voltages to the motor terminals according to position θ and to speed ω, and according to currents $i_m$ and voltages $u_m$ in order to provide a torque setpoint for electric machine (4). Means for determining (2) imposes a voltage $u_{imp}$ on electric machine (4).

Indeed, for the method according to the invention, a voltage $u_{imp}$ is injected (imposed) into the electric machine. This voltage has a high frequency $f_c$ which does not influence the motor control. The frequency $f_c$ of the injected voltage is higher than the frequency of the control signal of the electric machine according to the inequality as follows: $\omega_c = 2\pi f_c \gg \omega$. For example, frequency $f_c$ of the injected voltage is of the order of 1 kHz when the frequency of rotation of the rotor is, at low speed, on the order of 50 Hz. Signal injection makes the model observable, including at standstill and robust in rejecting measurement noise.

Moreover, the imposed voltage $u_{imp}$ has an amplitude $U_c$ higher than the amplitude of the control voltage of the electric machine. For example, amplitude $U_c$ of imposed voltage $u_{imp}$ is of the order of 10 V. With such a frequency $f_c$ and such an amplitude $U_c$, imposed voltage $u_{imp}$ has no influence on the control of the electric machine and the operation thereof is not disturbed, notably when the operating frequency of the electric machine is low.

Notations

The following notations are used in the description:

u are voltages at the terminals of the phases of the electric machine.

i are currents circulating in the phases of the electric machine.

θ is the rotor position, corresponding to the angle of rotation of the rotor of the electric machine in relation to the stator.

ω is the rotor speed, corresponding to the rotating speed of the rotor of the electric machine in relation to the stator.

$u_{imp}$ is the voltage imposed (injected) on the electric machine.

$U_c$ is the amplitude of voltage $u_{imp}$ imposed on the electric machine. It can be selected of the order of 10 V.

$f_c$ is the frequency of voltage $u_{imp}$ imposed on the electric machine. It can be selected of the order of 1 kHz. It is reminded that $\omega_c = 2\pi f_c$.

χ is the total magnetic flux through the electric machine.

R is the resistances of the coils of the electric machine which is a known parameter from manufacturer's data or experimentally obtained $L_d$ is the direct inductance of the electric machine which is a parameter of the electric machine that is known from manufacturer's data or experimentally obtained.

$L_q$ is the quadrature inductance of the electric machine which is a parameter of the electric machine that is known from manufacturer's data or experimentally obtained.

Φ is the magnetic flux created by the permanent magnets of the electric machine which is obtained from manufacturer's data or data that can be experimentally obtained.

x is the state representation of the current in the complex plane.

Φ is the phase shift induced by the continuous filter which is a function of the filter and it is known and depends on the fundamental frequency of the input signal.

$k_1$, $k_2$ and g are calibration variables allowing the convergence of the state observers to be managed.

$c_1$, $c_2$ and $a_1$ are state observer variables.

Also, the following relationships are defined:

$$\lambda = \frac{(L_d + L_q)}{2},$$

$$\eta = \frac{(L_d - L_q)}{2},$$

$$Q(\cdot) = \begin{bmatrix} \cos(\cdot) & \sin(\cdot) \\ \sin(\cdot) & -\cos(\cdot) \end{bmatrix},$$

and $$I = \begin{bmatrix} 1 & 0 \\ 0 & 1 \end{bmatrix}$$

$$\sigma = \frac{1}{\lambda^2 - \eta^2}, A = 4\lambda^2\eta^2\omega^2 + R^2\eta^2, B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A},$$

$$\alpha = -\sigma B e^{j\psi}, \beta = \sigma A e^{j\varphi}, \gamma = \frac{-j\omega\Phi}{\lambda - \eta}, \delta = \sigma\lambda, \varepsilon = -\sigma\eta$$

and $$y_n = \frac{x}{\|x\|}.$$

These notations, which are indexed by $_m$, represent the measured values. The estimated values are indicated by a circumflex. The time derivatives are indicated by a dot. The notations indexed by $_{\alpha\beta}$ mean that the quantities are expressed in the Concordia reference frame. j corresponds to the complex number. In the complex plane, the complex conjugate of a quantity is indicated by a segment above the quantity considered.

The invention allows determination of angular position θ and speed ω of a rotor of a synchronous electric machine with the electric machine being provided with means for measuring the voltage and the current of the phases of the electric machine. The method according to the invention is suited for determining of the position θ and the speed θ of the rotor in particular at low motor speed or when the electric machine is at standstill. Low motor speeds can be considered for rotating speeds of the electric machine which are lower than or substantially equal to 100 rpm. For the other motor speeds, the observers according to the invention can be less accurate. To overcome this drawback, another algorithm can be used for these motor speeds, for example the one described in the assignee's French patent application 11/03,994.

Figure 2:
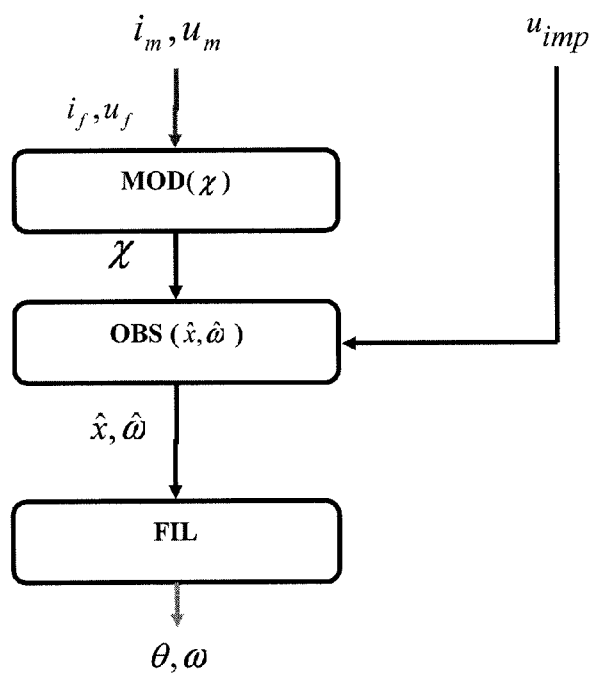
FIG. 2 is a flowchart of the method according to the invention.

FIG. 2 describes the various stages of the method according to the invention:
1) constructing a state model of the flux (MOD(χ));
2) constructing current and speed state observers (OBS ($\hat{x},\hat{\omega}$)); and
3) estimating the position by filtering (FIL).

Prior to these stages, currents i and voltages u in the phases of the electric machine are measured.

The synchronous electric machine is torque controlled through control of the voltages and currents of the power supplied to the phases of the synchronous electric machine. For optimum control of this motor, it is necessary to measure voltages $u_m$ at the phase terminals and currents $i_m$ circulating therein.

1) Constructing a State Model of the Flux (MOD(χ))

By using the measured or even filtered information, it is possible to reconstruct the total magnetic flux. The magnetic flux through the electric machine is the flux of the magnets plus the flux due to the magnetic armature reaction (i.e. due to the rotor) for a salient-pole synchronous electric machine. Reconstruction of the magnetic flux is enabled by the use of a flux dynamics representation.

According to an embodiment of the invention, the state model of the magnetic flux is constructed by carrying out the following stages:
 i) determining voltages $$u_{\alpha\beta} = \begin{pmatrix} u_\alpha \\ u_\beta \end{pmatrix}$$

and currents $$i_{\alpha\beta} = \begin{pmatrix} i_\alpha \\ i_\beta \end{pmatrix}$$

in the Concordia reference frame by transformation of the measured voltages and currents. It is to be noted that the Concordia transform is a mathematical tool used in electrical engineering to model a three-phase system by a two-phase model;
 ii) the state representation of the flux in the Concordia reference frame is written as follows: $\hat{\chi}_{\alpha\beta}=-Ri_{\alpha\beta}+u_{\alpha\beta}$.
 This law arises from the Joule/Faraday law.
Moreover, $$\chi_{\alpha\beta} = \begin{pmatrix} \chi_\alpha \\ \chi_\beta \end{pmatrix}$$

is a two-dimensional vector that represents the total magnetic flux through the windings of the motor and that is neither known nor measured. It can be expressed in the form as follows:

$$\chi_{\alpha\beta} = \begin{pmatrix} i_\alpha \\ i_\beta \end{pmatrix} + \Phi \begin{pmatrix} \cos(\theta) \\ \sin(\theta) \end{pmatrix} + \eta \begin{pmatrix} \cos(2\theta) & \sin(2\theta) \\ \sin(2\theta) & -\cos(2\theta) \end{pmatrix} \begin{pmatrix} i_\alpha \\ i_\beta \end{pmatrix}$$

with ϕ the flux created by the permanent magnets, parameters $$\lambda = \frac{(L_d + L_q)}{2}$$

and $$\eta = \frac{(L_d - L_q)}{2}$$

depending on the direct and quadrature inductances ($L_d,L_q$).

2) Constructing Current and Speed State Observers (OBS ($\hat{x},\hat{\omega}$))

In this stage, the state observers are constructed for the currents and the speed by use of the flux state model determined in the previous stage and of the voltage and current measurements. In automatics and information theory, a state observer is an extension of a model represented in the form of a state representation. When the state of a system is not measurable, an observer allows reconstruction of the state from a model of the dynamic system and the measurements of other quantities ($i_m,u_m$) is constructed.

According to an embodiment of the invention, the current and rotor speed state observers are constructed by carrying out the following stages:
 i) determining a state representation of current $i_{\alpha\beta}$ from the state representation of magnetic flux $\chi_{\alpha\beta}$ and the expression of the magnetic flux by a formula of the type:

$$i_{\alpha\beta} = -\sigma B \begin{pmatrix} \cos(\psi) & -\sin(\psi) \\ \sin(\psi) & \cos(\psi) \end{pmatrix} i_{\alpha\beta} + \sigma AQ(2\theta + \varphi) i_{\alpha\beta} + \frac{\Phi\omega}{\lambda - \eta} \begin{bmatrix} \sin\theta \\ -\cos\theta \end{bmatrix} + \frac{\lambda}{\lambda^2 - \eta^2} I u_{\alpha\beta} - \eta Q(2\theta) u_{\alpha\beta}$$

with ϕ the flux created by the permanent magnets of the electric machine, $$\lambda = \frac{(L_d + L_q)}{2} \text{ and } \eta = \frac{(L_d - L_q)}{2},$$

($L_d,L_q$) being the direct and quadrature inductances of the electric machine, $$Q(\cdot) = \begin{bmatrix} \cos(\cdot) & \sin(\cdot) \\ \sin(\cdot) & -\cos(\cdot) \end{bmatrix}, I = \begin{bmatrix} 1 & 0 \\ 0 & 1 \end{bmatrix} \text{ and}$$

$$\sigma = \frac{1}{\lambda^2 - \eta^2}, A = 4\lambda^2\eta^2\omega^2 + R^2\eta^2, B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

ii) transforming the state representation in the complex plane by putting $x=i_\alpha+ji_\beta$ and $u=u_\alpha+ju_\beta$ with j the complex number, the equivalent model can then take the form as follows:

$$\dot{x} = \alpha \cdot x + \beta \cdot e^{j2\theta} \cdot \bar{x} + \gamma \cdot e^{j\theta} + \delta \cdot u + \varepsilon \cdot e^{j2\theta} \cdot \bar{u}$$

with $$\alpha = -\sigma B e^{j\psi}, \beta = \sigma A e^{j\varphi}, \gamma = \frac{-j\omega\Phi}{\lambda - \eta}, \delta = \sigma\lambda, \varepsilon = -\sigma\eta;$$

and iii) considering that the model under study is a periodic system, the solution of the differential equations can be expressed in the form as follows:

$$x(t) = a_1 \cdot e^{j\theta} + c_1 \cdot e^{j\theta_c} + c_2 \cdot e^{j(2\theta - \theta_c)} \text{ with}$$

$$\dot{a}_1 = (\alpha - j\omega)a_1 + \beta\bar{a}_1 + \gamma$$

$$\dot{c}_1 = (\alpha - j\omega_c)c_1 + \beta\bar{c}_2 + \delta U_c$$

$$\dot{c}_2 = (\alpha - (2\omega - \omega_c)j)c_2 + \beta\bar{c}_1 + \varepsilon U_c.$$

$\theta_c$ is the position related to voltage $u_{imp}$ imposed on the electric machine, so that $\dot{\theta}_c = \omega_c = 2\pi f_c$. Thus the state observers can be determined for the current and the rotor speed (or the electrical frequency) by use of equations:

$$\dot{\hat{x}} = j\hat{\omega}\hat{x} + (-k_1 + jk_2)(\hat{x} - y_n)$$

$$\dot{\hat{\omega}} = g \cdot \text{Im}(\hat{x}(\hat{x} - y_n))$$

with $y_n = \dfrac{x}{\|x\|}$ the normalized current measurements and $k_1$, $k_2$ and $g$ are gains allowing the convergence of the observer to be managed.

3) Estimating the Position by Filtering (FIL)

In this stage, the position of the rotor is determined by the state observer of the rotating speed, of the measured current and of the imposed voltage.

According to an embodiment of the invention, the estimate of speed $\hat{\omega}$ is used to determine parameters $a_1$, $c_1$ and $c_2$. Under steady running conditions, equations as follows are thus obtained:

$$\hat{a}_1 = -\frac{L_q \Phi \hat{\omega}^2}{R^2 + \hat{\omega}^2 L_d L_q} - j\frac{R\Phi\hat{\omega}}{R^2 + \hat{\omega}^2 L_d L_q}$$

$$\hat{c}_1 = \frac{-jU_c(\lambda(2\hat{\omega} - \omega_c) + jR)}{\omega_c(\lambda^2 - \eta^2)(2\hat{\omega} - \omega_c) + R^2 + j2R\lambda(\omega_c - \hat{\omega})}$$

$$\hat{c}_2 = \frac{jU_c L_1(\hat{\omega} - \omega_c)}{\omega_c(\lambda^2 - \eta^2)(\omega_c - 2\hat{\omega}) - R^2 + j2R\lambda(\omega_c - \hat{\omega})}$$

Parameter $c_2$ can be determined from this system.

The final stage for obtaining the rotor position estimate filters the measured currents (and not the estimated currents) after multiplying them by term $e^{j\theta_c}$. A band-pass filter is thus formed, which filters the high frequencies, and therefore frequencies $f_c$ generated by the imposed voltage. Under such conditions, the filter output can be written as follows: $[e^{j\theta_c} \cdot x(t)]_F = c_2 \cdot e^{j(2\theta + \Phi)}$ with $\Phi$ being the known phase shift induced by the filter. Thus, the estimate of angular position $\theta$ of the rotor of the electric machine can be calculated by a formula: $\hat{\theta} = \frac{1}{2}(\text{angle}(x) - \text{angle}(\hat{c}_2) - \Phi)$. The phase shift depends on the fundamental frequency of the input signal, notably the currents according to an embodiment of the invention.

The method according to the invention can be combined with the method described in the assignee's French patent application 11/03,994 for low speeds (for example <100 rpm) for which the method according to the invention is applied, and for other speeds (for example >100 rpm), the method of the prior patent application is applied.

All the stages of the method are executed by computer tools which are software executed on a programmed processor and, notably provide a controller of the electric machine. Thus, the position and the speed of the rotor can be determined in real time. Indeed, one of the advantages of the method according to the invention is that it can be readily implemented on-line and that it can therefore be easily integrated in an electric/hybrid vehicle calculator.

The invention also relates to a method of controlling a synchronous electric machine, wherein the following stages are carried out:

determining position $\theta$ and speed $\omega$ of the rotor of the electric machine by use of the method described above, by injecting imposed voltage $u_{imp}$ as described above, and controlling the torque of the synchronous machine according to position $\theta$ and determined speed $\omega$. This stage can be carried out using any conventional form of vector control of the torque of the electric machine that is taken into account, in addition to the position and the speed of the rotor, the measured voltages and currents. Taking into account the position and the speed for control of the electric machine allows to precise determination of the behavior of the electric machine, which enables achieving a control suited to the operation thereof.

Furthermore, the invention relates to a system of controlling a synchronous electric machine for applying the control method as described above. Such a system (1) for controlling an electric machine (4) is illustrated in FIG. 1. Control means (1) of the electric machine are comprised of means (2) of determining the position and the speed of the rotor of electric machine (4) and means (3) of controlling the torque of electric machine (4). Means (2) determine the position and the speed of the rotor of electric machine (4) from the measurements of voltages and currents $u_m$ and $i_m$. These are the voltages and currents of each one of the three phases of electric machine (4). Torque control means (3) apply voltages at the motor terminals according to the internal temperatures, to speed $\omega$ and to voltages $u_m$ and currents $i_m$ in order to provide a torque setpoint for electric machine (4).

This control system can be used for a synchronous electric machine on-board a vehicle, notably an electric or hybrid motor vehicle. However, the control system described is not limited to this application and it is suited for all synchronous electric machine applications.

The invention claimed is:

1. A method for determining a position of a rotor of a salient-pole synchronous electric machine, wherein currents and voltages of phases of the electric machine are measured, comprising:

a) providing a voltage to the phases of the electric machine, the imposed voltage having an amplitude greater than a control voltage of the electrical machine and frequency greater than a control frequency of the electric machine;

b) constructing a state model of a total magnetic flux circulating in the electric machine which is a function of the position of a rotor of the machine;

c) constructing a state observer of currents and of speed of the rotor by using a state model of the total magnetic flux and the measured currents and the measured voltages; and d) determining the position of the rotor by using the state observer of speed and of the voltage.

2. A method as claimed in claim 1, wherein a rotating speed of the rotor is substantially equal to or below 100 rpm.

3. A method as claimed in claim 2, wherein the amplitude includes 10 V and the frequency includes 1 kHz.

4. A method as claimed in claim 3, wherein the voltage is expressed as $u_{imp}$ in a complex plane defined by a formula: $u_{imp}=U_c e^{j\theta_c}$, with j being a complex number and $\theta_c$ being a position of the rotor such that $\dot{\theta}_c=2\pi f_c$.

5. A method as claimed in claim 3, wherein the state model of the total magnetic flux expressed as $\chi_{\alpha\beta}$ circulating in the electric machine is constructed by:

i) determining the voltages expressed by $u_{\alpha\beta}$ and the currents expressed by $i_{\alpha\beta}$ in a Concordia reference frame by transformation of measured currents expressed by $i_m$ and measured voltages expressed by $u_m$; and ii) determining dynamics of the magnetic flux $\chi_{\alpha\beta}$ by an equation: $\dot{\chi}_{\alpha\beta}=-Ri_{\alpha\beta}+u_{\alpha\beta}$ with R being resistance of the windings of the electric machine.

6. A method as claimed in claim 5, wherein the state observers of the currents and of the rotor speed are constructed by:

i) determining a state representation of current represented by $i_{\alpha\beta}$ from the state model of the magnetic flux represented by $\chi_{\alpha\beta}$ by a formula:

$$\dot{i}_{\alpha\beta} = -\sigma B \begin{pmatrix} \cos(\psi) & -\sin(\psi) \\ \sin(\psi) & \cos(\psi) \end{pmatrix} i_{\alpha\beta} +$$

$$\sigma AQ(2\theta+\varphi)i_{\alpha\beta} + \frac{\Phi\omega}{\lambda-\eta}\begin{bmatrix} \sin\theta \\ -\cos\theta \end{bmatrix} + \frac{\lambda}{\lambda^2-\eta^2}Iu_{\alpha\beta} - \eta Q(2\theta)u_{\alpha\beta}$$

with $\phi$ being flux created by the permanent magnets of the electric machine, $$\lambda = \frac{(L_d+L_q)}{2}$$

and $$\eta = \frac{(L_d-L_q)}{2},$$

$(L_d, L_q)$ being direct and quadrature inductances of the electric machine, $$Q(\cdot) = \begin{bmatrix} \cos(\cdot) & \sin(\cdot) \\ \sin(\cdot) & -\cos(\cdot) \end{bmatrix},$$

$$I = \begin{bmatrix} 1 & 0 \\ 0 & 1 \end{bmatrix}$$

and $$\sigma = \frac{1}{\lambda^2-\eta^2},$$

$$A = 4\lambda^2\eta^2\omega^2 + R^2\eta^2, \ B = 4\eta^4\omega^2 + R^2\lambda^2,$$

$$\cos\psi = \frac{R\lambda}{B}, \ \sin\psi = \frac{2\omega\eta^2}{B}, \ \cos\varphi = \frac{R\eta}{A}, \ \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1+jk_2)(\hat{x}-y_n)$$

$$\dot{\hat{\omega}} = g\cdot\text{Im}(\hat{x}\overline{(\hat{x}-y_n)}),$$

with $y_n = \frac{x}{\|x\|}$ being the normalized current measurements and $k_1$, $k_2$ and g being gains allowing convergence of the observer to be managed.

7. A method as claimed in claim 2, wherein the voltage is expressed as $u_{imp}$ in a complex plane defined by a formula: $u_{imp}=U_c e^{j\theta_c}$, with j being a complex number and $\theta_c$ being a position of the rotor such that $\dot{\theta}_c=2\pi f_c$.

8. A method as claimed in claim 7, wherein the state model of the total magnetic flux $\chi_{\alpha\beta}$ circulating in the electric machine is constructed by:

i) determining voltages $u_{\alpha\beta}$ and currents $i_{\alpha\beta}$ in a Concordia reference frame by transformation of measured currents $i_m$ and voltages $u_m$; and ii) determining dynamics of the magnetic flux $\chi_{\alpha\beta}$ by an equation: $\dot{\chi}_{\alpha\beta}=-Ri_{\alpha\beta}+u_{\alpha\beta}$ with R being resistance of the windings of the electric machine.

9. A method as claimed in claim 8, wherein the state observers of the currents and of the rotor speed are constructed by:

i) determining a state representation of current represented by $i_{\alpha\beta}$ from the state model of the magnetic flux represented by $\chi_{\alpha\beta}$ by a formula:

$$\dot{i}_{\alpha\beta} = -\sigma B \begin{pmatrix} \cos(\psi) & -\sin(\psi) \\ \sin(\psi) & \cos(\psi) \end{pmatrix} i_{\alpha\beta} +$$

$$\sigma AQ(2\theta+\varphi)i_{\alpha\beta} + \frac{\Phi\omega}{\lambda-\eta}\begin{bmatrix} \sin\theta \\ -\cos\theta \end{bmatrix} + \frac{\lambda}{\lambda^2-\eta^2}Iu_{\alpha\beta} - \eta Q(2\theta)u_{\alpha\beta}$$

with $\phi$ being flux created by the permanent magnets of the electric machine, $$\lambda = \frac{(L_d+L_q)}{2}$$

and $$\eta = \frac{(L_d-L_q)}{2},$$

$(L_d, L_q)$ being direct and quadrature inductances of the electric machine, $$Q(\cdot) = \begin{bmatrix} \cos(\cdot) & \sin(\cdot) \\ \sin(\cdot) & -\cos(\cdot) \end{bmatrix},$$

-continued $$I = \begin{bmatrix} 1 & 0 \\ 0 & 1 \end{bmatrix}$$

and $$\sigma = \frac{1}{\lambda^2 - \eta^2},$$

$$A = 4\lambda^2\eta^2\omega^2 + R^2\eta^2, \quad B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1 + jk_2)(\hat{x} - y_n),$$

$$\dot{\hat{\omega}} = g \cdot \operatorname{Im}(\hat{x}\overline{(\hat{x} - y_n)})$$

with $y_n = \frac{x}{\|x\|}$ being the normalized current measurements and $k_1$, $k_2$ and g being gains allowing convergence of the observer to be managed.

10. A method as claimed in claim 2, wherein the state model of the total magnetic flux expressed as $\chi_{\alpha\beta}$ circulating in the electric machine is constructed by:
  i) determining the voltages expressed by $u_{\alpha\beta}$ and the currents expressed by $i_{\alpha\beta}$ in a Concordia reference frame by transformation of measured currents expressed by $i_m$ and measured voltages expressed by $u_m$; and
  ii) determining dynamics of the magnetic flux $\chi_{\alpha\beta}$ by an equation: $\dot\chi_{\alpha\beta}=-Ri_{\alpha\beta}+u_{\alpha\beta}$ with R being resistance of the windings of the electric machine.

11. A method as claimed in claim 10, wherein the state observers of the currents and of the rotor speed are constructed by:
  i) determining a state representation of current represented by $i_{\alpha\beta}$ from the state model of the magnetic flux represented by $\chi_{\alpha\beta}$ by a formula:

$$\dot{i}_{\alpha\beta} = -\sigma B\begin{pmatrix} \cos(\psi) & -\sin(\psi) \\ \sin(\psi) & \cos(\psi) \end{pmatrix}i_{\alpha\beta} +$$

$$\sigma AQ(2\theta+\varphi)i_{\alpha\beta} + \frac{\Phi\omega}{\lambda-\eta}\begin{bmatrix} \sin\theta \\ -\cos\theta \end{bmatrix} + \frac{\lambda}{\lambda^2-\eta^2}Iu_{\alpha\beta} - \eta Q(2\theta)u_{\alpha\beta}$$

with φ being flux created by the permanent magnets of the electric machine, $$\lambda = \frac{(L_d+L_q)}{2} \text{ and } \eta = \frac{(L_d-L_q)}{2},$$

$(L_d,L_q)$ being direct and quadrature inductances of the electric machine, $$Q(\cdot) = \begin{bmatrix} \cos(\cdot) & \sin(\cdot) \\ \sin(\cdot) & -\cos(\cdot) \end{bmatrix}, I = \begin{bmatrix} 1 & 0 \\ 0 & 1 \end{bmatrix} \text{ and}$$

-continued $$\sigma = \frac{1}{\lambda^2 - \eta^2}, A = 4\lambda^2\eta^2\omega^2 + R^2\eta^2, B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1 + jk_2)(\hat{x} - y_n),$$

$$\dot{\hat{\omega}} = g \cdot \operatorname{Im}(\hat{x}\overline{(\hat{x} - y_n)})$$

with $y_n = \frac{x}{\|x\|}$ being the normalized current measurements and $k_1$, $k_2$ and g being gains allowing convergence of the observer to be managed.

12. A method as claimed in claim 1, wherein the amplitude includes 10 V and the frequency includes 1 kHz.

13. A method as claimed in claim 12, wherein the state model of the total magnetic flux expressed as $\chi_{\alpha\beta}$ circulating in the electric machine is constructed by:
  i) determining the voltages expressed by $u_{\alpha\beta}$ and the currents expressed by $i_{\alpha\beta}$ in a Concordia reference frame by transformation of measured currents expressed by $i_m$ and measured voltages expressed by $u_m$; and
  ii) determining dynamics of the magnetic flux $\chi_{\alpha\beta}$ by an equation: $\dot\chi_{\alpha\beta}=-Ri_{\alpha\beta}+u_{\alpha\beta}$ with R being resistance of the windings of the electric machine.

14. A method as claimed in claim 13, wherein the state observers of the currents and of the rotor speed are constructed by:
  i) determining a state representation of current represented by $i_{\alpha\beta}$ from the state model of the magnetic flux represented by $\chi_{\alpha\beta}$ by a formula:

$$\dot{i}_{\alpha\beta} = -\sigma B\begin{pmatrix} \cos(\psi) & -\sin(\psi) \\ \sin(\psi) & \cos(\psi) \end{pmatrix}i_{\alpha\beta} +$$

$$\sigma AQ(2\theta+\varphi)i_{\alpha\beta} + \frac{\Phi\omega}{\lambda-\eta}\begin{bmatrix} \sin\theta \\ -\cos\theta \end{bmatrix} + \frac{\lambda}{\lambda^2-\eta^2}Iu_{\alpha\beta} - \eta Q(2\theta)u_{\alpha\beta}$$

with φ being flux created by the permanent magnets of the electric machine, $$\lambda = \frac{(L_d+L_q)}{2}$$

and $$\eta = \frac{(L_d-L_q)}{2},$$

$(L_d,L_q)$ being direct and quadrature inductances of the electric machine, $$Q(\cdot) = \begin{bmatrix} \cos(\cdot) & \sin(\cdot) \\ \sin(\cdot) & -\cos(\cdot) \end{bmatrix},$$

$$I = \begin{bmatrix} 1 & 0 \\ 0 & 1 \end{bmatrix}$$

and $$\sigma = \frac{1}{\lambda^2 - \eta^2},$$

$$A = 4\lambda^2\eta^2\omega^2 + R^2\eta^2, \quad B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1 + jk_2)(\hat{x} - y_n)$$

$$\dot{\hat{\omega}} = g \cdot \mathrm{Im}(\hat{x}(\hat{x} - y_n)),$$

with $y_n = \dfrac{x}{\|x\|}$ being the normalized current measurements and $k_1$, $k_2$ and g being gains allowing convergence of the observer to be managed.

15. A method as claimed in claim 1, wherein the voltage is expressed as $u_{imp}$ in a complex plane defined by a formula: $u_{imp}=U_c e^{j\theta_c}$, with j being a complex number and $\theta_c$ being a position of the rotor such that $\dot{\theta}_c=2\pi f_c$.

16. A method as claimed in claim 15, wherein the state model of the total magnetic flux expressed as $\chi_{\alpha\beta}$ circulating in the electric machine is constructed by:

i) determining the voltages expressed by $u_{\alpha\beta}$ and the currents expressed by $i_{\alpha\beta}$ in a Concordia reference frame by transformation of measured currents expressed by $i_m$ and measured voltages expressed by $u_m$; and ii) determining dynamics of the magnetic flux $\chi_{\alpha\beta}$ by an equation: $\dot{\chi}_{\alpha\beta}=-Ri_{\alpha\beta}+u_{\alpha\beta}$ with R being resistance of the windings of the electric machine.

17. A method as claimed in claim 16, wherein the state observers of the currents and of the rotor speed are constructed by:

i) determining a state representation of current represented by $i_{\alpha\beta}$ from the state model of the magnetic flux represented by $\chi_{\alpha\beta}$ by a formula:

$$i_{\alpha\beta} = -\sigma B \begin{pmatrix} \cos(\psi) & -\sin(\psi) \\ \sin(\psi) & \cos(\psi) \end{pmatrix} i_{\alpha\beta} +$$

$$\sigma A Q(2\theta + \varphi) i_{\alpha\beta} + \frac{\Phi\omega}{\lambda - \eta}\begin{bmatrix} \sin\theta \\ -\cos\theta \end{bmatrix} + \frac{\lambda}{\lambda^2 - \eta^2} I u_{\alpha\beta} - \eta Q(2\theta) u_{\alpha\beta}$$

with φ being flux created by the permanent magnets of the electric machine, $$\lambda = \frac{(L_d + L_q)}{2}$$

and $$\eta = \frac{(L_d - L_q)}{2},$$

($L_d$,$L_q$) being direct and quadrature inductances of the electric machine, $$Q(\cdot) = \begin{bmatrix} \cos(\cdot) & \sin(\cdot) \\ \sin(\cdot) & -\cos(\cdot) \end{bmatrix},$$

$$I = \begin{bmatrix} 1 & 0 \\ 0 & 1 \end{bmatrix}$$

and $$\sigma = \frac{1}{\lambda^2 - \eta^2},$$

$$A = 4\lambda^2\eta^2\omega^2 + R^2\eta^2, \quad B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1 + jk_2)(\hat{x} - y_n)$$

$$\dot{\hat{\omega}} = g \cdot \mathrm{Im}(\hat{x}(\hat{x} - y_n)),$$

with $y_n = \dfrac{x}{\|x\|}$ being the normalized current measurements and $k_1$, $k_2$ and g being gains allowing convergence of the observer to be managed.

18. A method as claimed in claim 15, wherein the position of the rotor represented by $\hat{\theta}$ is determined by:

i) determining a coefficient $\hat{c}_2$ from the state observer of speed $\hat{\omega}$ and from the voltage represented by $u_{imp}$ using an equation:

$$\hat{c}_2 = \frac{jU_c L_1(2\hat{\omega} - \omega_c)}{\omega_c(\lambda^2 - \eta^2)(\omega_c - 2\hat{\omega}) - R^2 + j2R\lambda\left(\omega_c - \dfrac{\hat{\omega}}{2}\right)}$$

with $\omega_c=2\pi f_c$, and ii) determining the position of the rotor represented by $\hat{\theta}$ with coefficient $\hat{c}_2$ and of measured currents x from an equation: $\hat{\theta}=\frac{1}{2}(\mathrm{angle}(x)-\mathrm{angle}(\hat{c}_2)-\Phi)$ with $\Phi$ being a phase shift induced by a low-pass filter of cutoff frequency $f_c$ of an estimated current $\hat{x}$.

19. A method as claimed in claim 12, wherein the voltage is expressed as $u_{imp}$ in a complex plane defined by a formula: $u_{imp}=U_c e^{j\theta_c}$, with j being a complex number and $\theta_c$ being a position of the rotor such that $\dot{\theta}_c=2\pi f_c$.

20. A method as claimed in claim 19, wherein the state model of the total magnetic flux $\chi_{\alpha\beta}$ circulating in the electric machine is constructed by:

i) determining voltages $u_{\alpha\beta}$ and currents $i_{\alpha\beta}$ in a Concordia reference frame by transformation of measured currents $i_m$ and voltages $u_m$; and ii) determining dynamics of the magnetic flux $\chi_{\alpha\beta}$ by an equation: $\dot{\chi}_{\alpha\beta}=-Ri_{\alpha\beta}+u_{\alpha\beta}$ with R being resistance of the windings of the electric machine.

21. A method as claimed in claim 20, wherein the state observers of the currents and of the rotor speed are constructed by:

i) determining a state representation of current represented by $i_{\alpha\beta}$ from the state model of the magnetic flux represented by $\chi_{\alpha\beta}$ by a formula:

$$\dot{i}_{\alpha\beta} = -\sigma B \begin{pmatrix} \cos(\psi) & -\sin(\psi) \\ \sin(\psi) & \cos(\psi) \end{pmatrix} i_{\alpha\beta} +$$

$$\sigma A Q(2\theta + \varphi) i_{\alpha\beta} + \frac{\Phi\omega}{\lambda - \eta}\begin{bmatrix} \sin\theta \\ -\cos\theta \end{bmatrix} + \frac{\lambda}{\lambda^2 - \eta^2} I u_{\alpha\beta} - \eta Q(2\theta) u_{\alpha\beta}$$

with $\phi$ being flux created by the permanent magnets of the electric machine, $$\lambda = \frac{(L_d + L_q)}{2}$$

and $$\eta = \frac{(L_d - L_q)}{2},$$

$(L_d, L_q)$ being direct and quadrature inductances of the electric machine, $$Q(\cdot) = \begin{bmatrix} \cos(\cdot) & \sin(\cdot) \\ \sin(\cdot) & -\cos(\cdot) \end{bmatrix},$$

$$I = \begin{bmatrix} 1 & 0 \\ 0 & 1 \end{bmatrix}$$

and $$\sigma = \frac{1}{\lambda^2 - \eta^2},$$

$A = 4\lambda^2\eta^2\omega^2 + R^2\eta^2$, $B = 4\eta^4\omega^2 + R^2\lambda^2$, $$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1 + jk_2)(\hat{x} - y_n)$$

$$\dot{\hat{\omega}} = g \cdot \mathrm{Im}\big(\hat{x}\overline{(\hat{x} - y_n)}\big),$$

with $y_n = \frac{x}{\|x\|}$ being the normalized current measurements and $k_1$, $k_2$ and g being gains allowing convergence of the observer to be managed.

22. A method as claimed in claim 1, wherein the state model of the total magnetic flux expressed as $\chi_{\alpha\beta}$ circulating in the electric machine is constructed by:

i) determining the voltages expressed by $u_{\alpha\beta}$ and the currents expressed by $i_{\alpha\beta}$ in a Concordia reference frame by transformation of measured currents expressed by $i_m$ and measured voltages expressed by $u_m$; and ii) determining dynamics of the magnetic flux $\chi_{\alpha\beta}$ by an equation: $\dot{\chi}_{\alpha\beta}=-Ri_{\alpha\beta}+u_{\alpha\beta}$ with R being resistance of the windings of the electric machine.

23. A method as claimed in claim 22, wherein the state observers of the currents and of the rotor speed are constructed by:

i) determining a state representation of current represented by $i_{\alpha\beta}$ from the state model of the magnetic flux represented by $\chi_{\alpha\beta}$ by a formula:

$$\dot{i}_{\alpha\beta} = -\sigma B \begin{pmatrix} \cos(\psi) & -\sin(\psi) \\ \sin(\psi) & \cos(\psi) \end{pmatrix} i_{\alpha\beta} +$$

$$\sigma A Q(2\theta + \varphi) i_{\alpha\beta} + \frac{\Phi\omega}{\lambda - \eta}\begin{bmatrix} \sin\theta \\ -\cos\theta \end{bmatrix} + \frac{\lambda}{\lambda^2 - \eta^2} I u_{\alpha\beta} - \eta Q(2\theta) u_{\alpha\beta}$$

with $\phi$ being flux created by the permanent magnets of the electric machine, $$\lambda = \frac{(L_d + L_q)}{2} \text{ and } \eta = \frac{(L_d - L_q)}{2},$$

$(L_d, L_q)$ being direct and quadrature inductances of the electric machine, $$Q(\cdot) = \begin{bmatrix} \cos(\cdot) & \sin(\cdot) \\ \sin(\cdot) & -\cos(\cdot) \end{bmatrix}, I = \begin{bmatrix} 1 & 0 \\ 0 & 1 \end{bmatrix} \text{ and}$$

$$\sigma = \frac{1}{\lambda^2 - \eta^2}, A = 4\lambda^2\eta^2\omega^2 + R^2\eta^2, B = 4\eta^4\omega^2 + R^2\lambda^2,$$

$$\cos\psi = \frac{R\lambda}{B}, \sin\psi = \frac{2\omega\eta^2}{B}, \cos\varphi = \frac{R\eta}{A}, \sin\varphi = \frac{-2\omega\lambda\eta}{A};$$

iii) transforming the state representation in a complex plane by letting $x=i_\alpha+ji_\beta$ and $u=u_\alpha+ju_\beta$, with j being the complex number; and determining the state observers of the current and of rotor speed by equations:

$$\dot{\hat{x}} = j\hat{\omega}\hat{x} + (-k_1 + jk_2)(\hat{x} - y_n),$$

$$\dot{\hat{\omega}} = g \cdot \mathrm{Im}\big(\hat{x}\overline{(\hat{x} - y_n)}\big)$$

with $y_n = \frac{x}{\|x\|}$ being the normalized current measurements and $k_1$, $k_2$ and g being gains allowing convergence of the observer to be managed.

24. A method as claimed in claim 23, wherein the position of the rotor represented by $\hat{\theta}$ is determined by:

i) determining a coefficient $\hat{c}_2$ from the state observer of the speed $\hat{\omega}$ and from the voltage represented by $u_{imp}$ using an equation:

$$\hat{c}_2 = \frac{jU_c L_1 (2\hat{\omega} - \omega_c)}{\omega_c(\lambda^2 - \eta^2)(\omega_c - 2\hat{\omega}) - R^2 + j2R\lambda\left(\omega_c - \frac{\hat{\omega}}{2}\right)}$$

with $\omega_c = 2\pi f_c$, and ii) determining the position of the rotor represented by $\hat{\theta}$ with coefficient $\hat{c}_2$ and of measured currents x from an equation: $\hat{\theta} = \frac{1}{2}(\text{angle}(x) - \text{angle}(\hat{c}_2) - \Phi)$ with $\Phi$ being a phase shift induced by a low-pass filter of cutoff frequency $f_c$ of an estimated current $\hat{x}$.

25. A method as claimed in claim 1, comprising:

determining the position of the rotor represented by $\hat{\theta}$ and the speed $\hat{\omega}$ of the rotor; and controlling torque of the synchronous electric machine in response to the determined position and speed.

26. A method as claimed in claim 1, comprising controlling the synchronous electric machine.

27. A method as claimed in claim 26, wherein the machine comprises a hybrid or electric motor vehicle.

\* \* \* \* \*